(12) United States Patent
Kai

(10) Patent No.: US 12,326,982 B2
(45) Date of Patent: Jun. 10, 2025

(54) KEYBOARD DEVICE, CONTROL METHOD, AND NON-TRANSITORY RECORDING MEDIUM

(71) Applicant: PFU LIMITED, Kahoku (JP)

(72) Inventor: Keisuke Kai, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 18/740,202

(22) Filed: Jun. 11, 2024

(65) Prior Publication Data

US 2024/0419259 A1 Dec. 19, 2024

(30) Foreign Application Priority Data

Jun. 14, 2023 (JP) ................................. 2023-097938

(51) Int. Cl.
G06F 3/02 (2006.01)
G06F 3/0354 (2013.01)

(52) U.S. Cl.
CPC ........ *G06F 3/0219* (2013.01); *G06F 3/03547* (2013.01)

(58) Field of Classification Search
CPC ...... G06F 3/0202; G06F 3/0219; G06F 3/023; G06F 3/02547
See application file for complete search history.

(56) References Cited

U.S. PATENT DOCUMENTS

| | | | |
|---|---|---|---|
| 6,037,929 A | 3/2000 | Ogura et al. | |
| 6,043,809 A * | 3/2000 | Holehan | G06F 3/021 |
| | | | 345/169 |
| 8,749,510 B2 * | 6/2014 | Park | G06F 3/0488 |
| | | | 345/173 |
| 2003/0142081 A1 | 7/2003 | Iizuka et al. | |
| 2011/0179372 A1 * | 7/2011 | Moore | G06F 3/0237 |
| | | | 715/810 |
| 2011/0187660 A1 | 8/2011 | Hirata et al. | |
| 2014/0104213 A1 | 4/2014 | Rekimoto | |
| 2014/0191977 A1 * | 7/2014 | Feng | G06F 3/04883 |
| | | | 345/173 |
| 2024/0419269 A1 * | 12/2024 | Ooki | G06F 3/0213 |

FOREIGN PATENT DOCUMENTS

| | | |
|---|---|---|
| JP | 10-78850 A | 3/1998 |
| JP | 2003-296015 A | 10/2003 |
| JP | 2010-26638 A | 2/2010 |
| JP | 2013-228786 A | 11/2013 |
| JP | 2014-194598 A | 10/2014 |
| JP | 2017-142644 A | 8/2017 |

* cited by examiner

*Primary Examiner* — Joe H Cheng
(74) *Attorney, Agent, or Firm* — WOMBLE BOND DICKINSON (US) LLP

(57) ABSTRACT

A keyboard device includes a key switch corresponding to a character, a plurality of touchpads, a memory to store mapping information, a communication interface to communicate with an information processing apparatus, and circuitry. In the mapping information, a code to be output to the information processing apparatus is set for each combination of operations on the plurality of touchpads. When a combination of operations on the plurality of touchpads is received, the circuitry identifies a code corresponding to the combination of operations on the plurality of touchpads based on the mapping information and outputs the identified code to the information processing apparatus via the communication interface.

8 Claims, 10 Drawing Sheets

FIG. 4

| KEY SWITCH | BUTTON | TOUCHPAD ON LEFT OF FRONT SIDE | TOUCHPAD ON LEFT SIDE | TOUCHPAD ON RIGHT OF FRONT SIDE | TOUCHPAD ON RIGHT SIDE | OUTPUT INFORMATION |
|---|---|---|---|---|---|---|
| 1 KEY | — | — | — | — | — | 1 CODE |
| 2 KEY | — | — | — | — | — | 2 CODE |
| — | LEFT BUTTON | — | — | — | — | LEFT CODE |
| — | RIGHT BUTTON | — | — | — | — | RIGHT CODE |
| — | — | OPERATION 01 | — | — | — | LEFT MOVEMENT CODE |
| FN1 KEY | — | OPERATION 01 | — | — | — | RIGHT MOVEMENT CODE |
| — | — | — | OPERATION 11 | — | — | UPWARD MOVEMENT CODE |
| FN1 KEY | — | — | OPERATION 11 | — | — | DOWNWARD MOVEMENT CODE |
| FN1 KEY | — | OPERATION 01 | OPERATION 11 | — | — | SHRINK CODE |
| FN1 KEY | — | OPERATION 01 | OPERATION 12 | — | — | ENLARGE CODE |
| FN1 KEY | — | OPERATION 01 | OPERATION 12 | — | — | RIGHT ROTATION CODE |
| FN1 KEY | — | OPERATION 01 | — | — | — | LEFT ROTATION CODE |
| — | — | — | — | OPERATION 01 | — | LEFT MOVEMENT CODE |
| — | — | — | — | OPERATION 01 | — | RIGHT MOVEMENT CODE |
| FN1 KEY | — | — | — | — | OPERATION 11 | UPWARD MOVEMENT CODE |
| FN1 KEY | — | — | — | OPERATION 01 | OPERATION 11 | DOWNWARD MOVEMENT CODE |
| FN1 KEY | — | — | — | OPERATION 01 | OPERATION 11 | LEFT ROTATION CODE |
| FN1 KEY | — | — | — | OPERATION 01 | OPERATION 11 | RIGHT ROTATION CODE |
| FN1 KEY | — | — | — | OPERATION 01 | OPERATION 12 | ENLARGE CODE |
| FN1 KEY | — | — | — | OPERATION 01 | OPERATION 12 | SHRINK CODE |
| ⋮ | ⋮ | ⋮ | ⋮ | ⋮ | ⋮ | ⋮ |

FIG. 5

| OPERATION | OPERATION DIRECTION | DURATION OF CONTACT | FREQUENCY OF CONTACT | AREA OF CONTACT | THE NUMBER OF CONTACT AREAS |
|---|---|---|---|---|---|
| OPERATION 01 | LEFT DIRECTION | x1 | n1 | a1 | m1 |
| OPERATION 02 | RIGHT DIRECTION | x2 | n2 | a2 | m2 |
| OPERATION 11 | DOWNWARD DIRECTION | x3 | n3 | a3 | m3 |
| OPERATION 12 | UPWARD DIRECTION | x4 | n4 | a4 | m4 |
| ... | ... | ... | ... | ... | ... |
| OPERATION z1 | — | xz1 | nz1 | az1 | mz1 |
| OPERATION z2 | LEFT DIRECTION | — | nz2 | az2 | mz2 |
| OPERATION z3 | LEFT DIRECTION | xz3 | — | az3 | mz3 |
| OPERATION z4 | LEFT DIRECTION | xz4 | nz4 | — | mz4 |
| OPERATION z5 | LEFT DIRECTION | xz5 | nz5 | az5 | — |
| ... | ... | ... | ... | ... | ... |

KEYBOARD DEVICE, CONTROL METHOD, AND NON-TRANSITORY RECORDING MEDIUM

CROSS-REFERENCE TO RELATED APPLICATIONS

This patent application is based on and claims priority pursuant to 35 U.S.C. § 119 (a) to Japanese Patent Application No. 2023-097938, filed on Jun. 14, 2023, in the Japan Patent Office, the entire disclosure of which is hereby incorporated by reference herein.

BACKGROUND

Embodiments of the present disclosure relate to a keyboard device, a control method, and a non-transitory recording medium.

Currently, various types of keyboard devices have been developed. In such a keyboard device, enhancing user convenience is desired.

A portable image display device provided with multiple touch sensors along the outer periphery of a display screen is disclosed.

SUMMARY

According to an embodiment, a keyboard device includes a key switch corresponding to a character, a plurality of touchpads, a memory to store mapping information, a communication interface to communicate with an information processing apparatus, and circuitry. In the mapping information, a code to be output to the information processing apparatus is set for each combination of operations on the plurality of touchpads. When a combination of operations on the plurality of touchpads is received, the circuitry identifies a code corresponding to the combination of the operations on the plurality of touchpads based on the mapping information and outputs the identified code to the information processing apparatus via the communication interface.

According to an embodiment, a control method includes storing mapping information in which a code to be output to an information processing apparatus is set for each combination of operations on a plurality of touchpads in a memory, and when a combination of operations on the plurality of touchpads is received, identifying a code corresponding to the combination of the operations on the plurality of touchpads based on the mapping information and outputting the identified code to the information processing apparatus via a communication interface.

According to an embodiment, a non-transitory recording medium storing a plurality of instructions which, when executed by one or more processors, causes the processors to perform a method. The method includes storing mapping information in which a code to be output to an information processing apparatus is set for each combination of operations on a plurality of touchpads in a memory, and when a combination of operations on the plurality of touchpads is received, identifying a code corresponding to the combination of the operations on the plurality of touchpads based on the mapping information and outputting the identified code to the information processing apparatus via a communication interface.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a schematic diagram illustrating an example of a data structure of a mapping table included in mapping information according to an embodiment;

FIG. 5 is a schematic diagram illustrating an example of a data structure of an operation table according to an embodiment;

Figure 1:
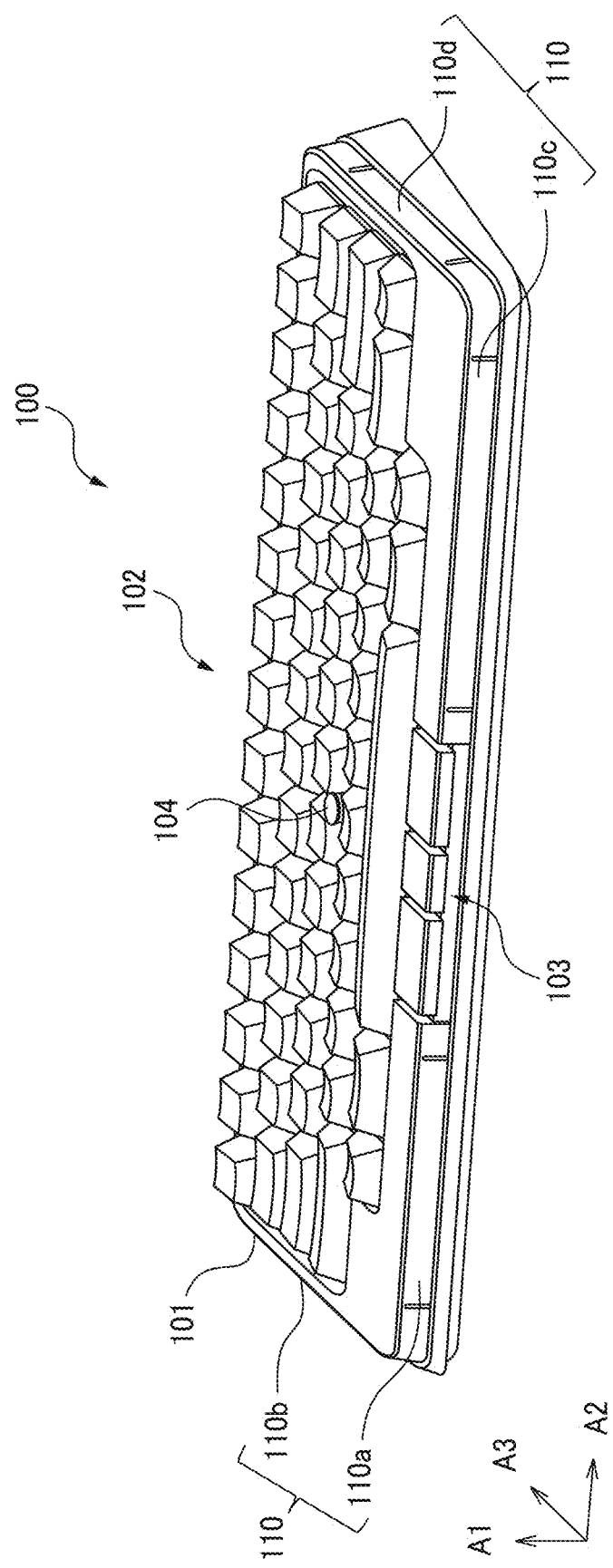
FIG. 1 is a perspective view of an input device according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In the descriptions of embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A keyboard device, a control method, and a control program according to embodiments of the present disclosure are described below with reference to the drawings. The technical scope of the present disclosure is not limited to the embodiments described below and covers equivalents of elements described below. Thus, numerous additional modifications and variations are possible in light of the above teachings.

Figure 2:
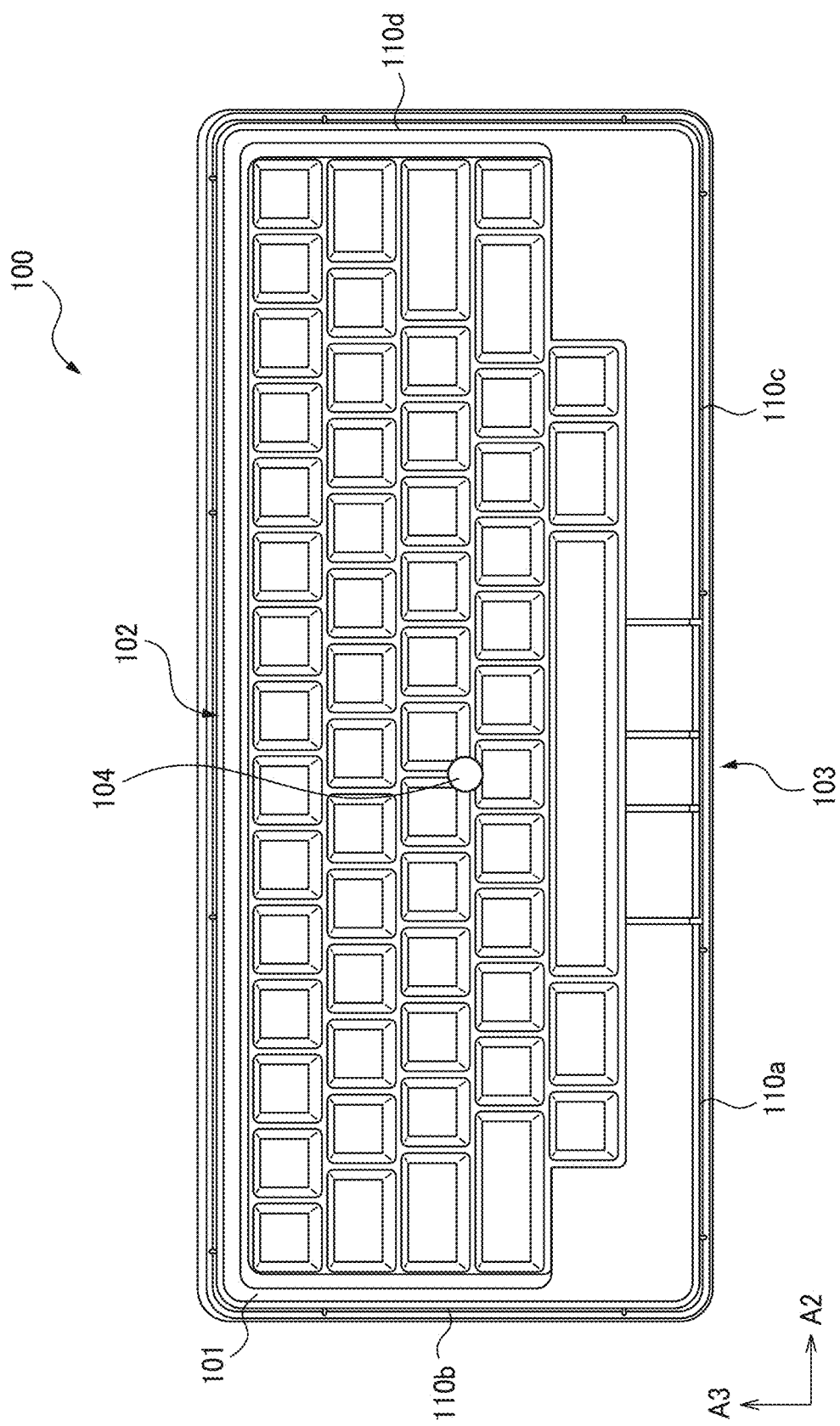
FIG. 2 is a top view of the input device.

FIG. 1 is a perspective view of an input device 100 according to an embodiment. FIG. 2 is a top view of the input device 100.

In FIG. 1, an arrow A1 indicates the substantially vertical direction (the height direction of the input device 100). In FIG. 1 and FIG. 2, an arrow A2 indicates the longitudinal direction (width direction) of the input device 100 that is perpendicular to the height direction, and an arrow A3 indicates the transverse direction (depth direction) of the input device 100 that is perpendicular to both the height and width directions.

The input device 100 is an example of a keyboard device. The input device 100 receives an input operation performed by a user and outputs an operation signal corresponding to the input operation to an information processing apparatus (for example, a personal computer or a portable information terminal) electrically connected to the input device 100.

The input device 100 includes a housing 101, multiple key switches 102, multiple buttons 103, a mouse pointer 104, and multiple touchpads 110. The multiple key switches 102, the multiple buttons 103, the mouse pointer 104, and the multiple touchpads 110 are arranged on the housing 101. The housing 101 does not include a display.

The multiple key switches 102 are arranged on the upper face of the housing 101. The multiple key switches 102 are keys having physical key tops. The multiple key switches 102 correspond to, for example, symbols or alphanumeric characters and are used to input them. The multiple key switches 102 include special keys for performing special operations. Examples of the special keys include Function keys, a Ctrl key, a Shift key, an Alt key, a WINDOWS (registered trademark) key, and Command keys.

The multiple buttons 103 are arranged from the upper face to the front side of the housing 101. The multiple buttons 103 can have functions similar to the functions of a left button, a right button, and a wheel button included in a standard three-button mouse. The multiple buttons 103 can have other functions used in a standard input device. In the following description, the multiple buttons 103 may collectively or individually be referred to as buttons 103 or button 103.

The mouse pointer 104 is arranged on the upper face of the housing 101. The mouse pointer 104 is disposed at a position relative to the position of the buttons 103, taking into account being operated in conjunction with one or more of the buttons 103. For example, the mouse pointer 104 is disposed at a position overlapping the buttons 103 in the width direction A2. Thus, the mouse pointer 104 is disposed at a position overlapping the buttons 103 in the depth direction A3 when viewed from the width direction A2. The mouse pointer 104 is used to designate an input position or coordinates on a screen of the information processing apparatus to which the input device 100 is connected.

The touchpad 110 includes touchpads 110a to 110d. In the following description, each of the touchpads 110a to 110d may individually be referred to as touchpad 110 when there is no need to distinguish between the touchpads 110a to 110d. Further, the touchpads 110a to 110d may collectively be referred to as touchpad 110 or touchpads 110. The touchpad 110a is arranged on the left portion of the front side of the housing 101, and the touchpad 110b is arranged on the left side of the housing 101. The pair of the touchpad 110a and the touchpad 110b is an example of a plurality of touchpads, and is an example of a pair of a first touchpad and a second touchpad, the second touchpad is different from the first touchpad. The touchpad 110c is arranged on the right portion of the front side of the housing 101, and the touchpad 110d is arranged on the right side of the housing 101. The pair of the touchpad 110c and the touchpad 110d is another example of a plurality of touchpads, and is another example of a pair of the first touchpad and the second touchpad.

The touchpad 110 is arranged along a side of the housing 101. The touchpad 110 is a capacitive or pressure-sensitive touchpad. The touchpad 110 includes one or more sensors to detect a touch of a user. When the touchpad 110 includes multiple sensors, the sensors are arranged along a side of the housing 101. Each sensor of the touchpad 100 outputs a detection signal that varies according to the detection status of the sensor. When the detection status of any sensor of the touchpad 110 changes, the touchpad 110 outputs an operation signal including the position and the detection signal of the sensor. The input device 100 detects a user operation (gesture) performed on the touchpad 110 based on the position of a sensor that has detected a touch of a user, the signal value of the detection signal, and the change in the position and the signal value over time. For example, when the signal value of the detection signal of any of the sensors is equal to or greater than a predetermined threshold value, the input device 100 detects a touch operation at the position of the sensor. When the signal value of the detection signal of a sensor that has detected the touch operation becomes equal to or less than the predetermined threshold value and when the signal value of the detection signal of another sensor adjacent to the sensor that has detected the touch operation becomes equal to or greater than the predetermined threshold value, the input device 100 detects a slide operation in a direction to the adjacent sensor from the sensor that has detected the touch operation prior to the adjacent sensor.

The touchpad 110 can have a gesture function for outputting a signal corresponding to an operation such as a slide (swipe), a flick, a tap, a double tap, a press, or a long press. The touchpad 110 is used to perform various actions such as vertical scrolling, horizontal scrolling, zooming in, zooming out, and rotation of an object on a screen displayed on the display of the information processing apparatus to which the input device 100 is connected.

The pair of the touchpads 110a and 110b or the pair of the touchpads 110c and 110d may be omitted. Alternatively, one of the touchpads 110a, 110b, 110c, and 110d may be omitted.

Figure 3:
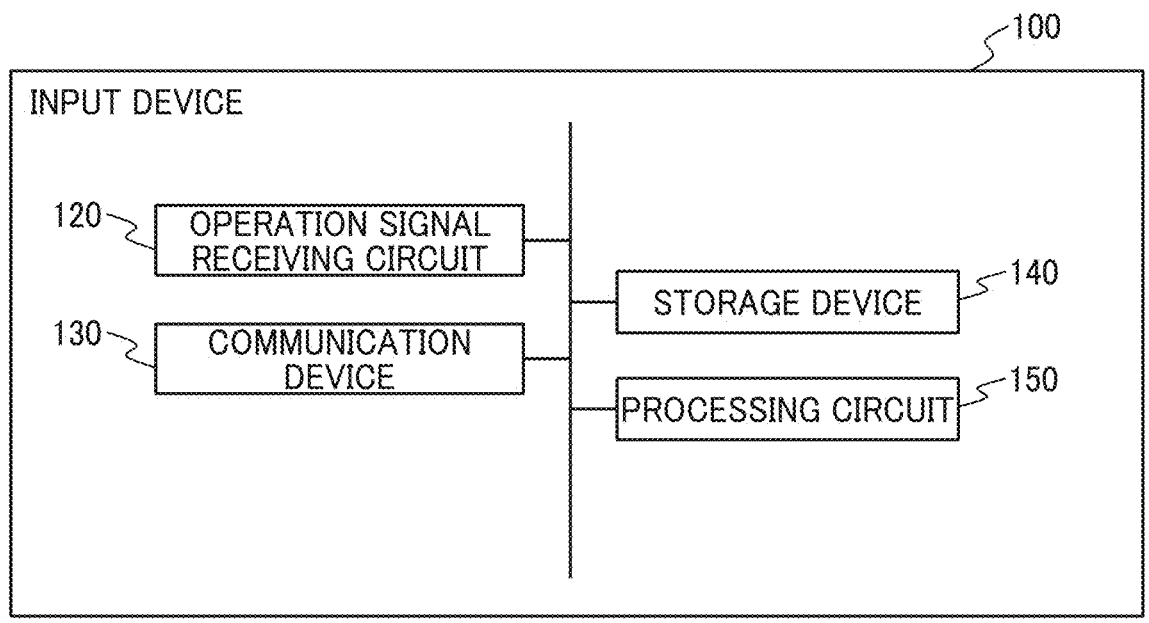
FIG. 3 is a schematic block diagram illustrating a configuration of an input device according to an embodiment.

FIG. 3 is a schematic block diagram illustrating a configuration of the input device 100 according to an embodiment. The input device 100 further includes an operation signal receiving circuit 120, a communication device 130, a storage device 140, a processing circuit (processing circuitry) 150, etc. in addition to the above-described components.

The operation signal receiving circuit 120 receives operation signals corresponding to input operations performed by the user from the multiple key switches 102, the multiple buttons 103, the mouse pointer 104, and the touchpad 110 and transmits the operation signals to the processing circuit 150.

The communication device 130 is an example of a communication interface that functions as a communication unit for communicating with the information processing apparatus. The communication device 130 includes an antenna that transmits and receives wireless signals, and a wireless communication interface circuit that transmits and receives signals to and from the information processing apparatus through a wireless communication line according to a predetermined communication protocol. The predetermined communication protocol is, for example, a wireless communication protocol using BLUETOOTH (registered trademark) or the Institute of Electrical and Electronics Engineers (IEEE) 802.15. The input device 100 may include an interface circuit compatible with a serial bus such as a universal serial bus (USB) instead of the communication device 130, and may be connected to the information processing apparatus with wire to transmit and receive signals.

The storage device 140 is an example of a memory. The storage device 140 includes, for example, a memory device such as a random access memory (RAM) and a read-only memory (ROM). The storage device 140 stores, for example, computer programs, databases, and tables used for various processes performed by the input device 100. The computer programs may be installed in the storage device 140 from a computer-readable portable recording medium using, for example, a known setup program. The portable recording medium is, for example, a compact disc read-only memory (CD-ROM) or a digital versatile disc read-only memory (DVD-ROM). The computer programs may be distributed from a server and installed in the storage device 140. The storage device 140 further stores mapping information and an operation table as data. Details of the mapping information and the operation table are described later.

The processing circuit 150 operates according to a program pre-stored in the storage device 140. The processing circuit 150 is, for example, a central processing unit (CPU). Alternatively, a digital signal processor (DSP), a large-scale integration (LSI), an application-specific integrated circuit (ASIC), a field-programmable gate array (FPGA), etc. may be used as the processing circuit 150 instead of a CPU. The processing circuit 150 is connected to the operation signal receiving circuit 120, the communication device 130, the storage device 140, etc., and controls them. The processing circuit 150 acquires operation signals from the multiple key switches 102, the multiple buttons 103, the mouse pointer 104, and the touchpads 110 via the operation signal receiving circuit 120. The processing circuit 150 converts the acquired operation signals into electrical signals, which will be output from the communication device 130 and processed by the information processing apparatus, and transmits the electrical signals to the information processing apparatus via the communication device 130.

FIG. 4 is a schematic diagram illustrating a data structure of a mapping table in mapping information according to an embodiment.

As illustrated in FIG. 4, in the mapping table, output information is assigned for each of the operations on the multiple key switches 102, the multiple buttons 103, and the touchpad 110.

The operation on the key switch 102 is pressing the key switch 102, and the operation on the button 103 is pressing the button 103. The operation on the touchpad 110 includes, operations corresponding to a slide (swipe), a flick, a tap, a double tap, a press, a long press, etc. The details of operations on the touchpad 110 are defined in an operation table.

The output information is information to be output to the information processing apparatus when an operation is performed. The output information is a code corresponding to an operation on the key switch 102, the button 103, the touchpad 110, or a combination of these. In other words, when an operation is performed, a code corresponding to the operation is output as output information. The code is a numerical sequence predetermined between the input device 100 and the information processing apparatus. The code functions as a command for causing the information processing apparatus to execute a corresponding action. The action includes vertical scrolling, horizontal scrolling, zooming in, zooming out, rotation of an object on a screen displayed on the display of the information processing apparatus.

The operation on the mouse pointer 104 is applying a force to the mouse pointer 104 in a predetermined direction. The output information of an operation performed on the mouse pointer 104 is movement information corresponding to the operation (a direction in which the force is applied and the strength of the force). The movement information indicates, the direction, the amount of pointer movement, etc. The movement information is information for moving an object such as a cursor displayed on the display of the information processing apparatus. The movement information functions as a command for causing the information processing apparatus to execute a corresponding action.

In the mapping table of the mapping information, a combination of multiple operations is also assigned with output information. The combination of operations includes a combination of operations on a plurality of touchpads, and a combination of operations on the plurality of touchpads and an operation on a special key of the multiple key switches 102.

In the following description of embodiments, a combination of operations on a plurality of touchpads to which an output information is assigned in the mapping information, that is, a combination of operations on both the touchpad 110a and the touchpad 110b or both touchpad 110c and the touchpad 110d, may be referred to as a combined operation. Further, a combination of operations on a plurality of touchpads and an operation on a special key to which output information is assigned in the mapping information, that is, a combination of the operation on the special key and the operations on both the touchpad 110a and the touchpad 110b or both the touchpad 110c and touchpad 110d, may also be referred to as a combined operation. The combined operations include a pinch operation and a rotation operation achieved by slide operations on the plurality of touchpads. The combined operation may be a combination of any operations including a slide operation, a flick operation, a tap operation, a double tap operation, a press operation, a long press operation, etc. on the plurality of touchpads.

By contrast, an operation on a single touchpad, that is, an operation on the touchpad 110a, 110b, 110c, or 110d alone, to which output information is assigned in the mapping information, may be referred to as a single operation. Further, a combination of an operation on a single touchpad and an operation on a special key, that is, a combination of an operation on one of the touchpad 110a, the touchpad 110b, the touchpad 110c, and the touchpad 110d and an operation on a special key to which output information is assigned in the mapping information may also be referred to as a single operation. The single operation is, for example, a slide (swipe) operation. The single operation may be any operation such as a flick operation, a tap operation, a double tap operation, a press operation, and a long press operation.

In the following description of embodiments, an operation on each of the multiple key switches 102 may be referred to as a key operation, an operation on each of the multiple buttons 103 may be referred to as a button operation, and an operation on the mouse pointer 104 may be referred to as a pointer operation.

The combination of the touchpad 110a arranged on the left portion of the front side of the housing 101 and the touchpad 110b arranged on the left side of the housing 101 is an example of a combination of a plurality of touchpad. Further, the combination of the touchpad 110d arranged on the right portion of the front side of the housing 101 and the touchpad 110b arranged on the right side of the housing 101 is also an example of a combination of a plurality of touchpads. In other words, in the present embodiment, the plurality of touchpads indicates either the pair of touchpads arranged adjacent to the left front corner of the housing with the left front corner in between the pair of touchpads or the pair of touchpads arranged adjacent to the right front corner of the housing with the right front corner in between the pair of touchpads. Because a code is set for each of combined operation on each pair of touchpads, a user can easily perform a predetermined action to the information processing apparatus with his or her left hand or right hand alone. As a result, the input device 100 can enhance user convenience.

Further, because a code is assigned to a combined operation of a combination of operations on a plurality of touchpads and an operation on a special key, the user can easily perform various actions to the information processing apparatus by operating only the input device 100 without using other devices. As a result, the input device 100 can enhance user convenience.

As described above, the operations, each of which is assigned with the output information in the mapping information, may include an operation corresponding to a combination of an operation on a single touchpad of the touchpads 110 and an operation on a special key of the multiple key switches 102. Further, the operations, each of which is assigned with the output information in the mapping information, do not include an operation on a special key alone. As a result, the input device 100 can have a special key with a conversion function so that when the special key is operated in combination with another operation, output information different from the output information assigned to said another operation is output.

The storage device 140 may store mapping information including a plurality of mapping tables each of which corresponds to one of a plurality of information processing apparatuses of different types, with different operating systems (OSs), etc. In this case, output information assigned to the same operation varies depending on the mapping table. Details of a changing operation for changing the mapping tables (components to be operated and operations to be performed on the components) are stored in the storage device 140.

FIG. 5 is a schematic diagram illustrating an example of a data structure of the operation table according to an embodiment.

As illustrated in FIG. 5, the operation table defines the details of operations performable on the touchpad 110. In the operation table, for each operation can be performed on the touchpad 110, operation direction on the touchpad 110, duration of contact with the touchpad 110, frequency of contact with the touchpad 110, area of contact with the touchpad 110, the number of contact areas on the touchpad 110, etc. are stored in association with each other. In other words, the operations on the touchpad 110 are distinguished based on one of the operation direction on the touchpad 110, the duration of contact with the touchpad 110, the frequency of contact with the touchpad 110, the area of contact with the touchpad 110, and the number of contact areas on the touchpad 110. The operations on the touchpad 110 may be distinguished based on at least one of the operation direction, the duration of contact, the frequency of contact, the area of contact, and the number of contact areas, rather than based on all of them.

The input device 100 can support a large number of types of operations on the touchpad 110 by defining the operations using various parameters.

Figure 6:
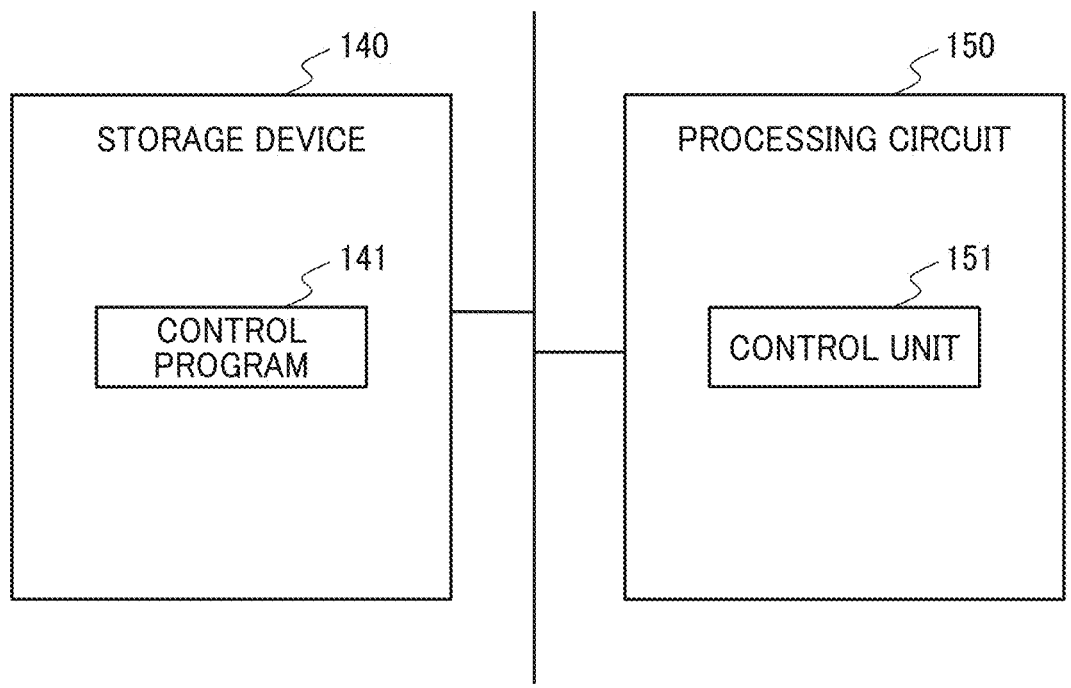
FIG. 6 is a schematic block diagram illustrating a configuration of a storage device and a processing circuit according to an embodiment.

FIG. 6 is a schematic block diagram illustrating a configuration of the storage device 140 and the processing circuit 150 according to an embodiment.

As illustrated in FIG. 6, the storage device 140 stores a control program 141 etc. The programs are functional modules implemented by software operating on processors. The processing circuit 150 reads a program from the storage device 140 and operates according to the read program to function as a control unit 151.

Figure 7:
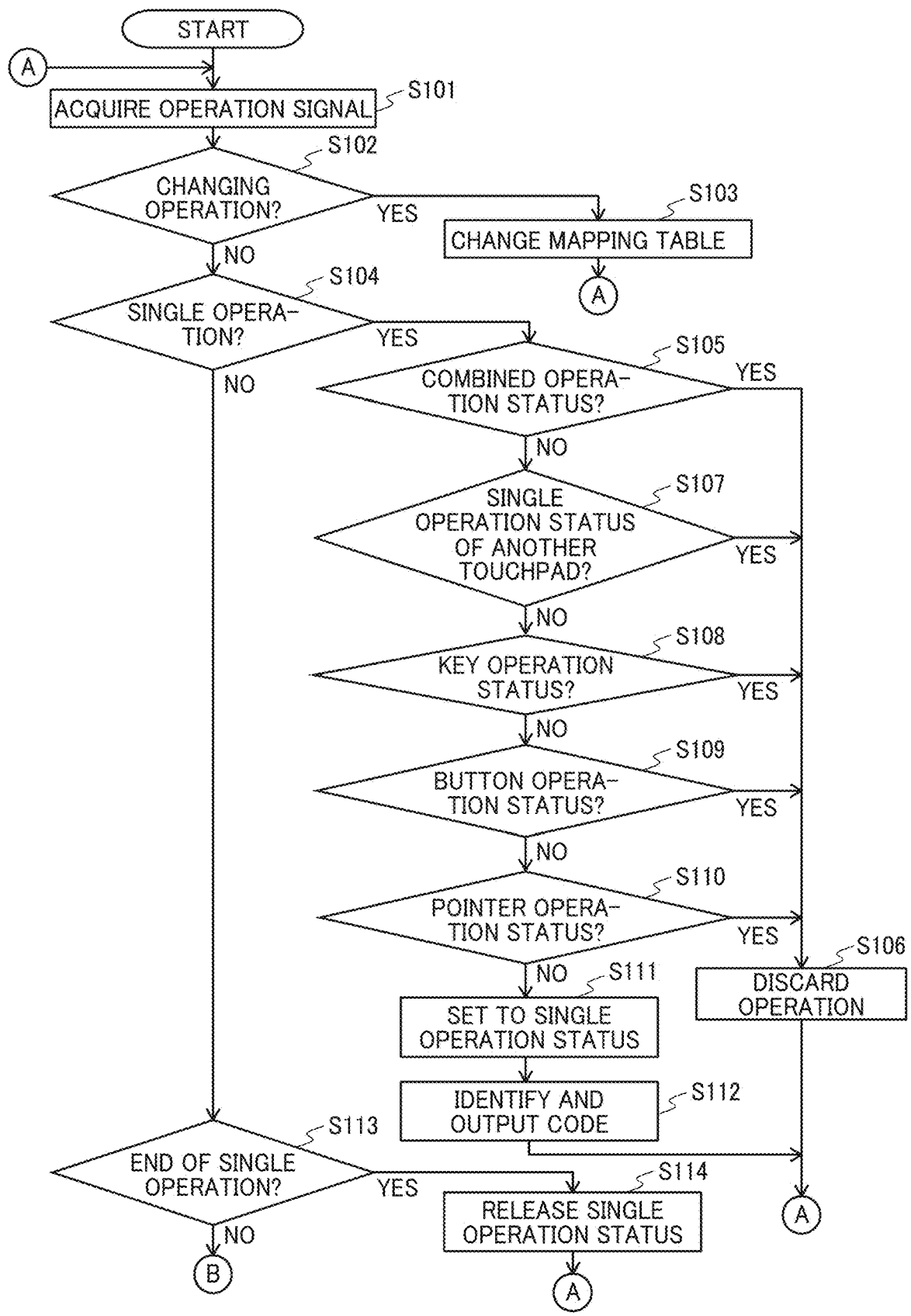
FIG. 7 is a flowchart illustrating an example of a control process according to an embodiment.
Figure 8:
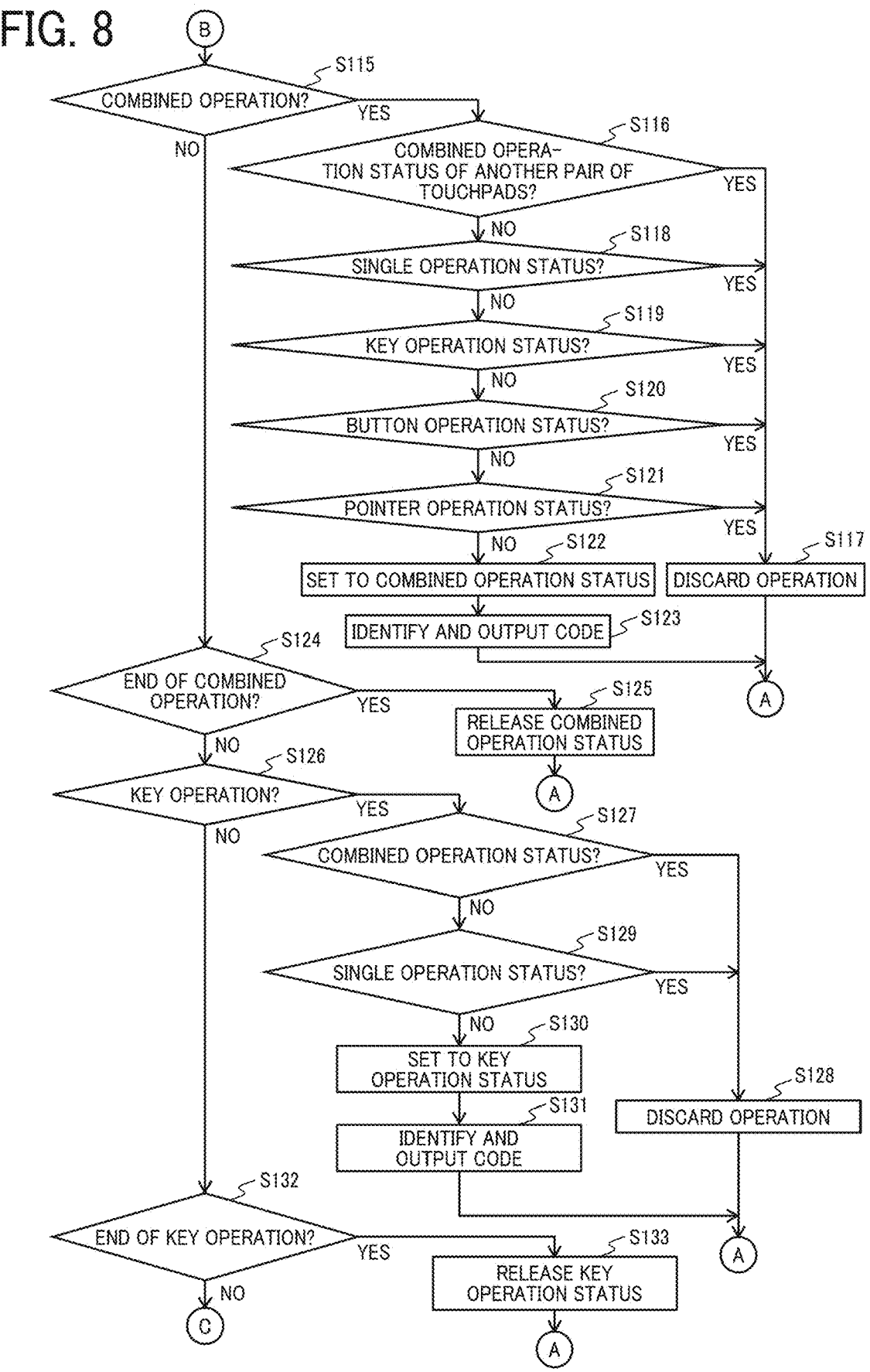
FIG. 8 is a flowchart illustrating an example of a control process according to an embodiment.
Figure 9:
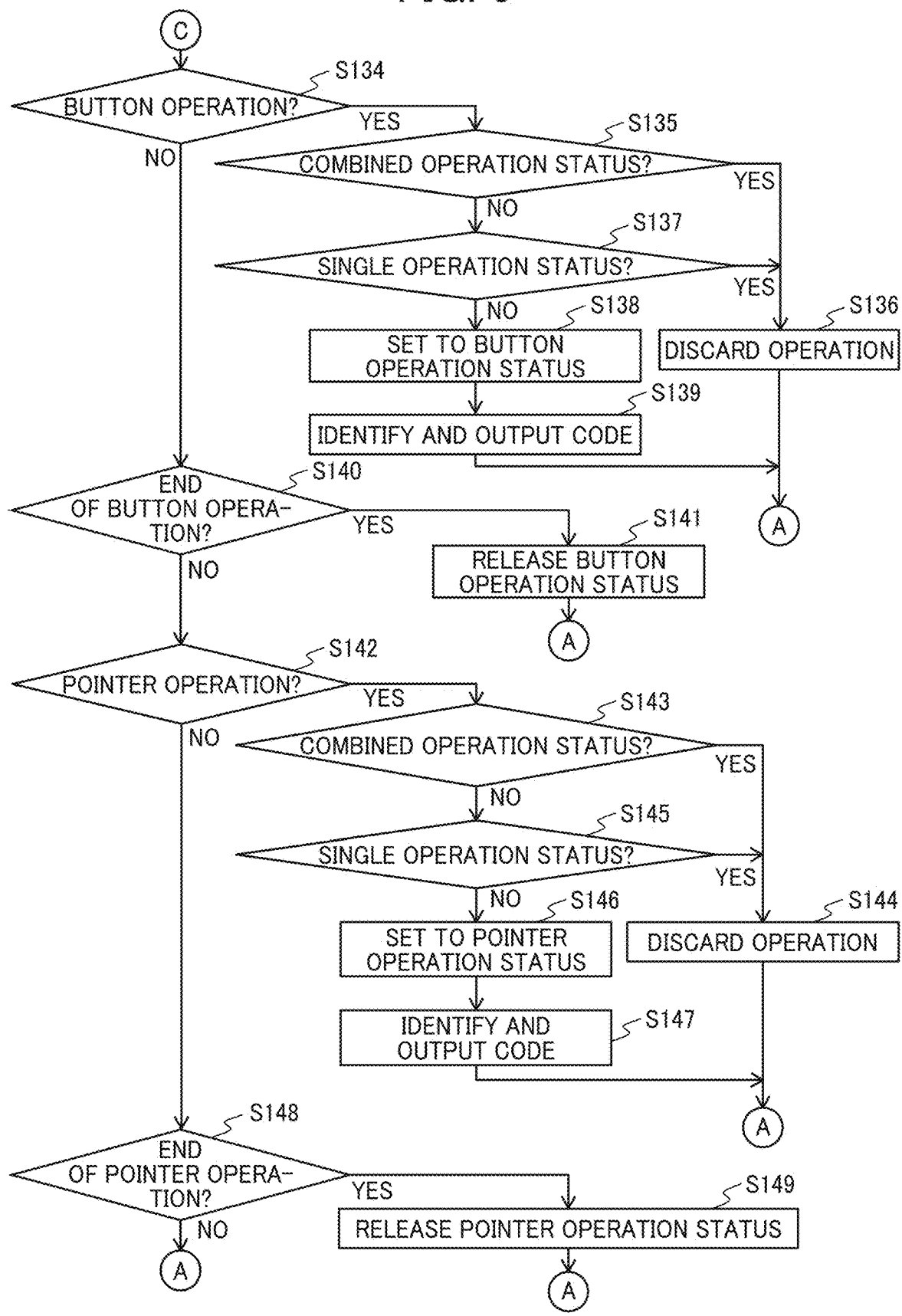
FIG. 9 is a flowchart illustrating an example of a control process according to an embodiment.

FIGS. 7, 8, and 9 are flowcharts illustrating examples of control processes executed by the input device 100. The control process is executed mainly by the processing circuit 150 in cooperation with one or more of the components in the input device 100 according to the program pre-stored in the storage device 140.

First, the control unit 151 waits until an operation signal is acquired (step S101). When any one of components (the key switch 102, the button 103, the mouse pointer 104, and the touchpad 110) receives an operation, the component outputs an operation signal corresponding to the operation to the operation signal receiving circuit 120. When receiving the operation signal from the component, the operation signal receiving circuit 120 converts the received operation signal into a predetermined format and outputs the converted operation signal to the processing circuit 150. The operation signal includes information indicating the component to which the operation has been performed and the type of the operation on the component.

When receiving multiple operation signals from multiple components within a sufficiently short period of time, the operation signal receiving circuit 120 may combine the received multiple operation signals into one and output to the processing circuit 150. Further, when the control unit 151 receives multiple operation signals from the operation signal receiving circuit 120 within a sufficiently short period of time, the control unit 151 may process the received multiple operation signals collectively.

Subsequently, the control unit 151 determines whether the operation indicated by the acquired operation signal is a changing operation (Step S102).

When the operation indicated by the operation signal is a changing operation, the control unit 151 identifies a mapping table that corresponds to the changing operation from the storage device 140 and changes the mapping table currently used to the identified mapping table (Step S103). Then, the process returns to Step S101. As described above, the control unit 151 changes the mapping table in response to a user request. As a result, the input device 100 can change the mapping table according to the type or the OS of the information processing apparatus connected to the input device 100 and can support various information processing apparatuses accordingly.

When the operation indicated by the operation signal is not a changing operation in Step S102, the control unit 151 determines whether the operation indicated by the operation signal is a single operation on a single touchpad (Step S104). The control unit 151 refers to the mapping table and the operation table stored in the storage device 140, and determines whether the operation indicated by the operation signal is a single operation to which output information is assigned in the mapping table.

When the operation signal indicates a single operation, the control unit 151 determines whether the current operation status of the input device 100 is a combined operation status (Step S105). The combined operation status indicates that the input device 100 is outputting a code assigned to a combined operation. The operation status is set to the combined operation status from when a combined operation is performed until an end condition of the combined operation is satisfied. When the operation status is a combined operation status, the control unit 151 determines that the previous combined operation is ongoing, and discards the operation signal without outputting a code assigned to the single operation indicated by the operation signal (Step S106). Then, the control unit 151 returns the process to Step S101.

On the other hand, when the operation status is not a combined operation status, the control unit 151 determines whether the operation status is a single operation status of another touchpad that is different from the touchpad that has received the operation and indicated by the operation signal (Step S107). For example, when the touchpad that has received the operation is the touchpad 110*a*, another touchpad is one of the touchpads 110*b*, 110*c*, and 110*d*. The single operation status is a status where the input device 100 is outputting a code assigned to a single operation. The single operation status of another touchpad is a status in which the input device 100 is outputting a code assigned to a single operation performed on said another touchpad. The single operation status is set to the operation status from when a single operation is performed until an end condition of the single operation is satisfied. When the operation status is a single operation status of another touchpad, the control unit 151 determines that the previous single operation is ongoing, and discards the operation signal without outputting a code assigned to the single operation indicated by the operation signal (Step S106). Then, the control unit 151 returns the process to Step S101.

On the other hand, when the operation status is not a single operation status of another touchpad, the control unit 151 determines whether the operation status is a key operation status (Step S108). The key operation status is a status where the input device 100 is outputting a code assigned to a key operation. The key operation status is set to the operation status from when a key operation is performed until an end condition of the key operation is satisfied. When the operation status is a key operation status, the control unit 151 determines that the previous key operation is ongoing, and discards the operation signal without outputting a code assigned to the single operation indicated by the operation signal (Step S106). Then, the control unit 151 returns the process to Step S101.

On the other hand, when the operation status is not a key operation status, the control unit 151 determines whether the operation status is a button operation status (Step S109). The button operation status is a status where the input device 100 is outputting a code assigned to a button operation. The button operation status is set to the operation status from when a button operation is performed until an end condition of the button operation is satisfied. When the operation status is a button operation status, the control unit 151 determines that the previous button operation is ongoing, and discards the operation signal without outputting a code assigned to the single operation indicated by the operation signal (Step S106). Then, the control unit 151 returns the process to Step S101.

On the other hand, when the operation status is not a button operation status, the control unit 151 determines whether the operation status is a pointer operation status (Step S110). The pointer operation status is a status where the input device 100 is outputting movement information assigned to a pointer operation. The pointer operation status is set to the operation status from the time when a pointer operation is performed until an end condition of the pointer operation is satisfied. When the operation status is a pointer operation status, the control unit 151 determines that the previous pointer operation is ongoing, and discards the operation signal without outputting a code assigned to the single operation indicated by the operation signal (Step S106). Then, the control unit 151 returns the process to Step S101.

On the other hand, when the operation status is not a pointer operation status, the control unit 151 sets the operation status to a single operation status of the touchpad that has received the operation indicated by the operation signal (Step S111).

Subsequently, the control unit 151 refers to the mapping information and the operation table stored in the storage device 140, and identifies output information (code) assigned to the operation (single operation) indicated by the operation signal. The control unit 151 outputs the identified output information (code) to the information processing apparatus via the communication device 130 (Step S112), and returns the process to Step S101.

As described above, when a single operation is performed on one of the pair of touchpads, the control unit 151 outputs a code assigned to the single operation on the touchpad. Further, as described in Step S105, when a single operation is performed on one of the pair of touchpads while a combined operation is being performed, the control unit 151 does not output a code assigned to the single operation. In other words, when the control unit 151 is outputting a code assigned to a combined operation, the control unit 151 does not output a code assigned to the single operation even when a user's finger is separated from one of the pair of touchpads. Accordingly, even when the user's finger is separated from the one of the touchpads by mistake while the user is performing a pinch operation, a rotation operation, etc., the control unit 151 does not cause the information processing apparatus to execute an action corresponding to a slide operation on the other touchpad of the pair of touchpads. Further, when outputting the code assigned to the combined operation on the pair of touchpads, the control unit 151 does not output a code assigned to an operation on another touchpad, even when the operation is performed on said another touchpad. As a result, the input device 100 can prevent the occurrence of an erroneous operation on the plurality of touchpads and enhance user convenience.

Further, as described in Step S107, when a single operation is performed on one of a pair of touchpads while the control unit 151 is outputting a code assigned to a single operation on the other of the pair of touchpads, the control unit 151 does not output a code assigned to the single operation on the one of the pair of touchpads. Accordingly, even when the user touches one of a pair of touchpads by mistake while performing a slide operation etc. on the other of the pair of touchpads, the control unit 151 does not cause the information processing apparatus to execute an action corresponding to the single operation on the one of the touchpads. As a result, the input device 100 can prevent the occurrence of an erroneous operation on the plurality of touchpads and enhance user convenience.

Further, as described in Step S108, when a single operation is performed on one of the touchpads while a key operation is being performed on one of the key switches and the control unit 151 is outputting a code assigned to the key operation, the control unit 151 does not output a code assigned to the single operation. Accordingly, even when the user touches a touchpad by mistake while performing an operation on any one of the key switches, the control unit 151 does not cause the information processing apparatus to execute an action corresponding to an operation on the touchpad. As a result, the input device 100 can prevent the occurrence of an erroneous operation and enhance user convenience.

Further, as described above, the operations, each of which is assigned with the output information in the mapping information, include an operation corresponding to a combination of an operation on a single touchpad and an operation on a special key, and do not include an operation on a special key alone. Accordingly, when a single operation is performed on a single touchpad while a key operation is performed on a special key, the control unit 151 outputs a code corresponding to the combination of the key operation on the special key and the single operation on the single touchpad. In other words, in this case, the control unit 151 outputs a code corresponding to the combination of the key operation on the special key and the single operation on the single touchpad. In other words, the control unit 151 executes processing corresponding to the combination of the key operation on the special key and the single operation on the single touchpad. Accordingly, the input device 100 can increase the variation of codes to be output by using a special key.

Further, as described in Step S109, when a single operation is performed on one of the touchpads while a button operation is being performed on any one of the buttons, the control unit 151 does not output a code assigned to the single operation. Accordingly, even when the user touches a touchpad by mistake while performing an operation on any one of the buttons, the control unit 151 does not cause the information processing apparatus to execute an action corresponding to an operation on the touchpad. As a result, the input device 100 can prevent the occurrence of an erroneous operation and enhance user convenience.

As described in Step S110, when a single operation is performed on a single touchpad while a pointer operation is performed on the mouse pointer 104, the control unit 151 does not output a code assigned to the single operation. Accordingly, even when the user touches a touchpad by mistake while performing an operation on the mouse pointer 104, the control unit 151 does not cause the information processing apparatus to execute an action corresponding to an operation on the touchpad. As a result, the input device 100 can prevent the occurrence of an erroneous operation and enhance user convenience.

When the operation signal does not indicate a single operation in Step S104, the control unit 151 determines whether the operation signal indicates the end of a single operation (Step S113). For example, when the operation status is a single operation status and the corresponding single operation being performed is a slide operation, a press operation, or a long press operation, the control unit 151 determines whether the operation signal indicates that the user's finger is separated from the operated touchpad. When the operation status is a single operation status and the operation signal indicates that the user's finger is separated from the operated touchpad, the control unit 151 determines that the operation signal indicates the end of the single operation.

When the operation signal indicates the end of the single operation, the control unit 151 releases the single operation status (Step S114), and returns the process to Step S101. In other words, while outputting a code assigned to a single operation performed on one of the touchpads, the control unit 151 determines that the single operation is ended when the user's finger is separated from the one of the touchpads. This allows the user performing an operation such as a slide operation, a press operation, or a long press operation to keep the current operation ongoing even when the user accidentally touches another component, as long as the user continues to touch the touchpad currently being operated. Further, this allows the user to determine whether the operation is ongoing according to whether the user continuously touches the touchpad currently being operated and correctly recognize the current operation status. As a result, the input device 100 can enhance user convenience.

When the single operation being performed is a flick operation, a tap operation, or a double tap operation, the control unit 151 may release the single operation status when a predetermined time has elapsed since the operation status is set to the single operation status in Step S111. In this case, the control unit 151 monitors the elapse of the predetermined time asynchronously with the control process.

When the operation signal does not indicate the operation corresponding to the end of the single operation in Step S113, the control unit 151 determines whether the operation signal indicates a combined operation on a plurality of touchpads (Step S115). The control unit 151 refers to the mapping information and the operation table stored in the storage device 140, and determines whether the operation signal indicates a combined operation to which output information is assigned in the mapping information.

When the operation signal indicates a combined operation, the control unit 151 determines whether the operation status is a combined operation status of another plurality of touchpads different from the plurality of touchpads that has received the operation and indicated by the operation signal (Step S116). For example, when the plurality of touchpads that has received the operation is the pair of the touchpads 110a and 110b, the other plurality of touchpads is the pair of the touchpads 110c and 110d. The combined operation status of the other plurality of touchpads is a status where the input device 100 is outputting a code assigned to a combined operation on the other plurality of touchpads. When the operation status is a combined operation status of the other plurality of touchpads, the control unit 151 determines that the previous combined operation is ongoing, and discards the operation signal without outputting a code assigned to the combined operation indicated by the operation signal (Step S117). Then, the control unit 151 returns the process to Step S101.

On the other hand, when the operation status is not in a combined operation status of the other plurality of touchpads, the control unit 151 determines whether the operation status is a single operation status (Step S118). When the operation status is a single operation status, the control unit 151 determines that the previous single operation is ongoing, and discards the operation signal without outputting a code assigned to the combined operation indicated by the operation signal (Step S117). Then, the control unit 151 returns the process to Step S101.

On the other hand, when the operation status is not a single operation status, the control unit 151 determines whether the operation status is a key operation status (Step S119). When the operation status is a key operation status, the control unit 151 determines that the previous key operation is ongoing, and discards the operation signal without outputting a code assigned to the combined operation indicated by the operation signal (Step S117). Then, the control unit 151 returns the process to Step S101.

On the other hand, when the operation status is not a key operation status, the control unit 151 determines whether the operation status is a button operation status (Step S120). When the operation status is a button operation status, the control unit 151 determines that the previous button operation is ongoing, and discards the operation signal without outputting a code assigned to the combined operation indicated by the operation signal (Step S117). Then, the control unit 151 returns the process to Step S101.

On the other hand, when the operation status is not a button operation status, the control unit 151 determines whether the operation status is a pointer operation status (Step S121). When the operation status is a pointer operation status, the control unit 151 determines that the previous pointer operation is ongoing, and discards the operation signal without outputting a code assigned to the combined operation indicated by the operation signal (Step S117). Then, the control unit 151 returns the process to Step S101.

On the other hand, when the operation status is not a pointer operation status, the control unit 151 sets the operation status to a combined operation status of the plurality of touchpads that has received the operation indicated by the operation signal (Step S122).

Subsequently, the control unit 151 refers to the mapping information and the operation table stored in the storage device 140, and identifies output information (code) that is assigned to the operation (combined operation) indicated by the operation signal. The control unit 151 outputs the identified output information (code) to the information processing apparatus via the communication device 130 (Step S123), and the process returns to Step S101.

As described above, when operations on the plurality of touchpads are received, that is, a combined operation is received, the control unit 151 outputs a code assigned to the combined operation based on the mapping information. This allows the user to easily perform a fine operation such as vertical or horizontal scrolling, zooming in or out, or rotation using the input device 100, and the input device 100 can enhance user convenience.

Further, as described above, the combined operation includes a combination of operations on a plurality of touchpads and an operation on a special key. Thus, when operations on a plurality of touchpads and an operation on a special key are received, that is, a combined operation is received, the control unit 151 outputs a code assigned to the combined operation that corresponds to the combination of the operations on the plurality of touchpads and the operation on the special key based on the mapping information. Accordingly, the input device 100 can increase the variation of codes to be output by using a special key.

Further, the control unit 151 outputs a code corresponding to the operation directions on the plurality of touchpads. Alternatively, the control unit 151 outputs a code corresponding to the durations of contact, the frequencies of contact, the areas of contacts, or the numbers of contact areas on the plurality of touchpads. Accordingly, the input device 100 can increase the variation of operations on the touchpad.

When a combined operation is performed on the touchpad 110a and the touchpad 110b or the touchpad 110c and the touchpad 110d, the control unit 151 outputs a code assigned to the combined operation. As described in Step S118, when a combined operation is performed on a pair of touchpads while a single operation is being performed on one of the pair of touchpads, the control unit 151 does not output a code assigned to the combined operation. In other words, when a single operation is performed on one of a pair of touchpads while the control unit 151 is outputting a code assigned to the previously received single operation on the other of the pair of touchpads, the control unit 151 does not output a code assigned to a combined operation. Accordingly, even when the user touches one of the pair of touchpads by mistake while performing a slide operation etc. on the other of the pair of touchpads, the control unit 151 does not cause the information processing apparatus to execute an action, such as a pinch operation, a rotation operation, etc. corresponding to the operation on the pair of touchpads. As a result, the input device 100 can prevent the occurrence of an erroneous operation on the plurality of touchpads and enhance user convenience.

Further, as described in Step S119, when a combined operation is performed on a pair of touchpads while a key operation is being performed on any one of the key switches other than the special keys, the control unit 151 does not output a code assigned to the combined operation. Accordingly, even when the user touches a touchpad by mistake while performing an operation on any one of the key switches other than the special keys, the control unit 151 does not cause the information processing apparatus to execute an action corresponding to an operation on the touchpad. As a result, the input device 100 can prevent the occurrence of an erroneous operation and enhance user convenience.

Further, as described above, the operations, each of which is assigned with the output information in the mapping information, include an operation corresponding to a combination of operations on a pair of touchpads and an operation on a special key, and does not include an operation on a special key alone. Accordingly, when a combined operation is performed on a pair of touchpads while a key operation is performed on a special key, the control unit 151 outputs a code corresponding to the combination of the key operation on the special key and the combined operation on the pair of touchpads. In other words, in this case, the control unit 151 outputs a code corresponding to the combination of the key operation on the special key and the combined operation on the pair of touchpads. In other words, the control unit 151 executes processing corresponding to the combination of the key operation on the special key and the combined operation on the pair of touchpads. Accordingly, the input device 100 can increase the variation of codes to be output by using a special key.

Further, as described in Step S120, when a combined operation is performed on a pair of touchpads while a button operation is being performed on any one of the buttons, the control unit 151 does not output a code assigned to the combined operation. Accordingly, even when the user touches a touchpad by mistake while performing an operation on any one of the buttons, the control unit 151 does not cause the information processing apparatus to execute an action corresponding to an operation on the touchpad. As a result, the input device 100 can prevent the occurrence of an erroneous operation and enhance user convenience.

As described in Step S121, when a combined operation is performed on a pair of touchpads while a pointer operation is performed on the mouse pointer 104, the control unit 151 does not output a code assigned to the combined operation. Accordingly, even when the user touches a touchpad by mistake while performing an operation on the mouse pointer 104, the control unit 151 does not cause the information processing apparatus to execute an action corresponding to an operation on the touchpad. As a result, the input device 100 can prevent the occurrence of an erroneous operation and enhance user convenience.

As described above, when a single operation is performed on any one of the touchpads, a combined operation on the pair of touchpads is invalidated. The input device 100 receives a combined operation only when operations on a pair of touchpads are performed simultaneously while no other operation is ongoing. For example, when performing a pinch operation or a rotation operation, the user first simultaneously touches a pair of touchpads and then performs slides operations on the pair of touchpads. This clearly indicates the intention of the user to operate the pair of touchpads, and the input device 100 can prevent the occurrence of an erroneous operation.

When the operation signal does not indicate a combined operation in Step S115, the control unit 151 determines whether the operation signal indicates the end of a combined operation (Step S124). For example, when the operation status is a combined operation status and the corresponding combined operation being performed is an operation such as a pinch operation or a rotation operation that includes a slide operation, a press operation, or a long press operation, the control unit 151 determines whether the operation signal indicates that the user's fingers are separated from the pair of operated touchpads. When the operation status is a combined operation status and the operation signal indicates that the user's fingers are separated from the pair of operated touchpads, the control unit 151 determines that the operation signal indicates the end of the combined operation.

When the operation signal indicates the end of a combined operation, the control unit 151 releases the combined operation status (Step S125), and the process returns to Step S101. In other words, while outputting a code assigned to a combined operation on the pair of touchpads, the control unit 151 determines that the combined operation is ended when the user's fingers are separated from the pair of touchpads. This allows the user performing an operation such as a pinch operation or a rotation operation to keep the current operation ongoing even when the user accidentally touches another component, as long as the user continues to touch the touchpads currently being operated. Further, this allows the user to determine whether the operation is ongoing according to whether the user continues to touch the touchpad currently being operated and correctly recognize the current operation status. As a result, the input device 100 can enhance user convenience.

When the combined operation being performed is a combination of any operations of a flick operation, a tap operation, and a double tap operation, the control unit 151 may release the combined operation status when a predetermined time has elapsed since the operation status is set to the combined operation status in Step S122. In this case, the control unit 151 monitors the elapse of the predetermined time asynchronously with the control process.

When the operation signal does not indicate the end of a combined operation in Step S124, the control unit 151 determines whether the operation signal indicates a key operation on any one of the key switches 102 (Step S126). The control unit 151 refers to the mapping information and the operation table stored in the storage device 140, and determines whether the operation signal indicates a key operation to which output information is assigned in the mapping information.

When the operation signal indicates a key operation, the control unit 151 determines whether the operation status is a combined operation status (Step S127). When the operation status is a combined operation status, the control unit 151 determines that the previous combined operation is ongoing, and discards the operation signal without outputting a code assigned to the key operation indicated by the operation signal (Step S128). Then, the control unit 151 returns the process to Step S101.

On the other hand, when the operation status is not a combined operation status, the control unit 151 determines whether the operation status is a single operation status (Step S129). When the operation status is a single operation status, the control unit 151 determines that the previous single operation is ongoing, and discards the operation signal without outputting a code assigned to the key operation indicated by the operation signal (Step S128).

Then, the control unit 151 returns the process to Step S101.

On the other hand, when the operation status is not a single operation status, the control unit 151 sets the operation status to a key operation status (Step S130).

Subsequently, the control unit 151 refers to the mapping information and the operation table stored in the storage device 140, and identifies output information (code) that is assigned to the operation (key operation) indicated by the operation signal. The control unit 151 outputs the identified code to the information processing apparatus via the communication device 130 (Step S131), and the process returns to Step S101.

As described above, when a key operation is performed on one of the multiple key switches 102, the control unit 151 outputs a code assigned to the key operation. Further, as described in Step S127, when a key operation is performed on any of the multiple key switches 102 while the control unit 151 is outputting a code assigned to a combined operation, the control unit 151 does not output a code assigned to the key operation. Accordingly, even when the user touches a key switch by mistake while performing a pinch operation, a rotation operation, etc. on a pair of touchpads, the control unit 151 does not cause the information processing apparatus to execute an action corresponding to the key switch. As a result, the input device 100 can prevent the occurrence of an erroneous operation and enhance user convenience.

Further, as described in Step S129, when a key operation is performed on any one of the multiple key switches 102 while the control unit 151 is outputting a code assigned to a single operation, the control unit 151 does not output a code assigned to the key operation. Accordingly, even when the user touches a key switch by mistake while performing a slide operation etc. on a touchpad, the control unit 151 does not cause the information processing apparatus to execute an action corresponding to the key switch. As a result, the input device 100 can prevent the occurrence of an erroneous operation and enhance user convenience.

On the other hand, when the operation signal does not indicate a key operation in Step S126, the control unit 151 determines whether the operation signal indicates the end of a key operation (Step S132). For example, when the operation status is a key operation status, the control unit 151 determines whether the operation signal indicates that the user's finger is separated from the operated key switch. When the operation status is a key operation status and the operation signal indicates that the user's finger is separated from the operated key switch, the control unit 151 determines that the operation signal indicates the end of the key operation.

When the operation signal indicates the end of a key operation, the control unit 151 releases the key operation status (Step S133), and the process returns to Step S101. When the operation status is a key operation status, the control unit 151 may release the key operation status when a predetermined time has elapsed since the user's finger is separated from the operated key switch. In this case, the control unit 151 monitors the elapse of the predetermined time asynchronously with the control process.

When the operation signal does not indicate the end of a key operation in Step S132, the control unit 151 determines whether the operation signal indicates a button operation on any one of the buttons 103 (Step S134). The control unit 151 refers to the mapping information and the operation table stored in the storage device 140, and determines whether the operation signal indicates a button operation to which output information is assigned in the mapping information.

When the operation signal indicates a button operation, the control unit 151 determines whether the operation status indicates a combined operation status (Step S135). When the operation status is a combined operation status, the control unit 151 determines that the previous combined operation is ongoing, and discards the operation signal without outputting a code assigned to the button operation indicated by the operation signal (Step S136). Then, the control unit 151 returns the process to Step S101.

On the other hand, when the operation status is not a combined operation status, the control unit 151 determines whether the operation status is a single operation status (Step S137). When the operation status is a single operation status, the control unit 151 determines that the previous single operation is ongoing, and discards the operation signal without outputting a code assigned to the button operation indicated by the operation signal (Step S136). Then, the control unit 151 returns the process to Step S101.

On the other hand, when the operation status is not a single operation status, the control unit 151 sets the operation status to a button operation status (Step S138).

Subsequently, the control unit 151 refers to the mapping information and the operation table stored in the storage device 140, and identifies output information (code) that is assigned to the operation (button operation) indicated by the operation signal. The control unit 151 outputs the identified code to the information processing apparatus via the communication device 130 (Step S139), and the process returns to Step S101.

As described above, when a button operation is performed on one of the multiple buttons 103, the control unit 151 outputs a code assigned to the button operation. Further, as described in Step S135, when a button operation is performed on any one of the multiple buttons 103 while the control unit 151 is outputting a code assigned to a combined operation, the control unit 151 does not output a code assigned to the button operation. Accordingly, even when the user touches a button by mistake while performing a pinch operation, a rotation operation, etc. on a pair of touchpads, the control unit 151 does not cause the information processing apparatus to execute an action corresponding to the button. As a result, the input device 100 can prevent the occurrence of an erroneous operation and enhance user convenience.

Further, as described in Step S137, when a button operation is performed on any one of the multiple buttons 103 while the control unit 151 is outputting a code assigned to a single operation, the control unit 151 does not output a code assigned to the button operation.

Accordingly, even when the user touches a button by mistake while performing a slide operation etc. on a touchpad, the control unit 151 does not cause the information processing apparatus to execute an action corresponding to the button. As a result, the input device 100 can prevent the occurrence of an erroneous operation and enhance user convenience.

On the other hand, when the operation signal does not indicate a button operation in Step S134, the control unit 151 determines whether the operation signal indicates the end of a button operation (Step S140). For example, when the operation status is a button operation status, the control unit 151 determines whether the operation signal indicates that the user's finger is separated from the operated button. When the operation status is a button operation status and the operation signal indicates that the user's finger is separated from the operated button, the control unit 151 determines that the operation signal indicates the end of the button operation.

When the operation signal indicates the end of a button operation, the control unit 151 releases the button operation status (Step S141), and the process returns to Step S101. When the operation status is a button operation status, the control unit 151 may release the button operation status when a predetermined time has elapsed since the user's finger is separated from the operated button. In this case, the control unit 151 monitors the elapse of the predetermined time asynchronously with the control process.

When the operation signal does not indicate the end of a button operation in Step S140, the control unit 151 determines whether the operation signal indicates a pointer operation on the mouse pointer 104 (Step S142).

When the operation signal indicates a pointer operation, the control unit 151 determines whether the operation status is a combined operation status (Step S143). When the operation status is a combined operation status, the control unit 151 determines that the previous combined operation is ongoing, and discards the operation signal without outputting movement information corresponding to the pointer operation indicated by the operation signal (Step S144). Then, the control unit 151 returns the process to Step S101.

On the other hand, when the operation status is not a combined operation status, the control unit 151 determines whether the operation status is a single operation status (Step S145). When the operation status is a single operation status, the control unit 151 determines that the previous single operation is ongoing, and discards the operation signal without outputting movement information corresponding to the pointer operation indicated by the operation signal (Step S144). Then, the control unit 151 returns the process to Step S101.

On the other hand, when the operation status is not a single operation status, the control unit 151 sets the operation status to a pointer operation status (Step S146).

Subsequently, the control unit 151 identifies output information (movement information) that corresponds to the operation (pointer operation) indicated by the operation signal. The control unit 151 outputs the identified output information (movement information) to the information processing apparatus via the communication device 130 (Step S147), and the process returns to Step S101.

As described above, when a pointer operation is performed on the mouse pointer 104, the control unit 151 outputs movement information corresponding to the pointer operation. Further, as described in Step S143, when a pointer operation is performed on the mouse pointer 104 while the control unit 151 is outputting a code assigned to a combined operation, the control unit 151 does not output movement information corresponding to the pointer operation. Accordingly, even when the user touches the mouse pointer 104 by mistake while performing a pinch operation, a rotation operation, etc. on a pair of touchpads, the control unit 151 does not cause the information processing apparatus to execute an action corresponding to the operation on the mouse pointer 104. As a result, the input device 100 can prevent the occurrence of an erroneous operation and enhance user convenience.

Further, as described in Step S145, when a pointer operation is performed on the mouse pointer 104 while the control unit 151 is outputting a code assigned to a single operation, the control unit 151 does not output movement information corresponding to the pointer operation. Accordingly, even when the user touches the mouse pointer 104 by mistake while performing a slide operation etc. on a touchpad, the control unit 151 does not cause the information processing apparatus to execute an action corresponding to the operation on the mouse pointer 104. As a result, the input device 100 can prevent the occurrence of an erroneous operation and enhance user convenience.

On the other hand, when the operation signal does not indicate a pointer operation in Step S142, the control unit 151 determines whether the operation signal indicates the end of a pointer operation (Step S148). For example, when the operation status is a pointer operation status, the control unit 151 determines whether the operation signal indicates the stopping of the mouse pointer 104. When the operation status is a pointer operation status and the operation signal indicates the stopping of the mouse pointer 104, the control unit 151 determines that the operation signal indicates the end of the pointer operation.

When the operation signal indicates the end of a pointer operation, the control unit 151 releases the pointer operation status (Step S149), and the process returns to Step S101. The control unit 151 may release the pointer operation status when a predetermined time has elapsed from the setting of the operation status to the pointer operation status in Step S146 or when a predetermined time has elapsed from the stopping of the mouse pointer 104. In this case, the control unit 151 monitors the elapse of the predetermined time asynchronously with the control process.

The processing of Step S105, S107, S108, S109, S110, S116, S118, S119, S120, S121, S127, S129, S135, S137, S143, or S145 may be omitted. Further, the processing of Steps S102 to S103, the processing of Steps S104 to S114, the processing of Steps S115 to S125, the processing of Steps S126 to S133, the processing of Steps S134 to S141, or the processing of Steps S142 to S149 may be omitted.

As detailed above, when the input device 100 receives a combined operation on the plurality of touchpads 110, the input device 100 transmits a code assigned to the combined operation on one of two pairs of touchpads 110 to the information processing apparatus. This allows the user to easily perform various operations using the input device 100, and the input device 100 can enhance user convenience accordingly.

The input device 100 does not accept a combined operation on a pair of touchpads while receiving a single operation on one of the pair of touchpads, and does not accept a single operation on one of the pair of touchpads while receiving a combined operation on the pair of the touchpads. As a result, the input device 100 can prevent the occurrence of an erroneous operation on the plurality of touchpads.

The input device 100 does not include a display. The input device 100 is used as an input device of an information processing apparatus separated from the input device 100. By using the input device 100, the user can favorably perform operations on an object displayed on a screen of the information processing apparatus to which the input device 100 is connected.

Further, since the input device 100 includes the touchpad 110 in addition to the multiple key switches 102, the user can perform various operations using the input device 100 alone. This can allow the user to cause the information processing apparatus to execute an action such as sliding, pinching, or rotating without moving his or her hand to a device other than the input device 100. Accordingly, the input device 100 can reduce the time and effort required for user operations.

Further, functions that have been typically implemented with shortcut keys in an information processing apparatus can be implemented by operating the touchpad 110 of the input device 100. This allows the user to eliminate the high learning cost such as learning shortcut keys and perform the functions that have been done by using shortcut keys with intuitive user operations.

Further, the input device 100 appropriately disables access to the touchpad 110. The input device 100 having such a function can prevent unintentional setting or unintended status transition due to an unintentional touch on the touchpad 110 when the user is carrying the input device 100 or operating the input device 100. Further, when an operation is received while a specific operation is being received, the input device 100 prioritizes the operation received first and continue the operation. When the user performs an operation after performing a specific operation, the user is likely to explicitly end the specific operation, and is less likely to perform another operation while performing the specific operation. The input device 100 can prevent the occurrence of an erroneous operation by prioritizing and continuing the operation received first.

Figure 10:
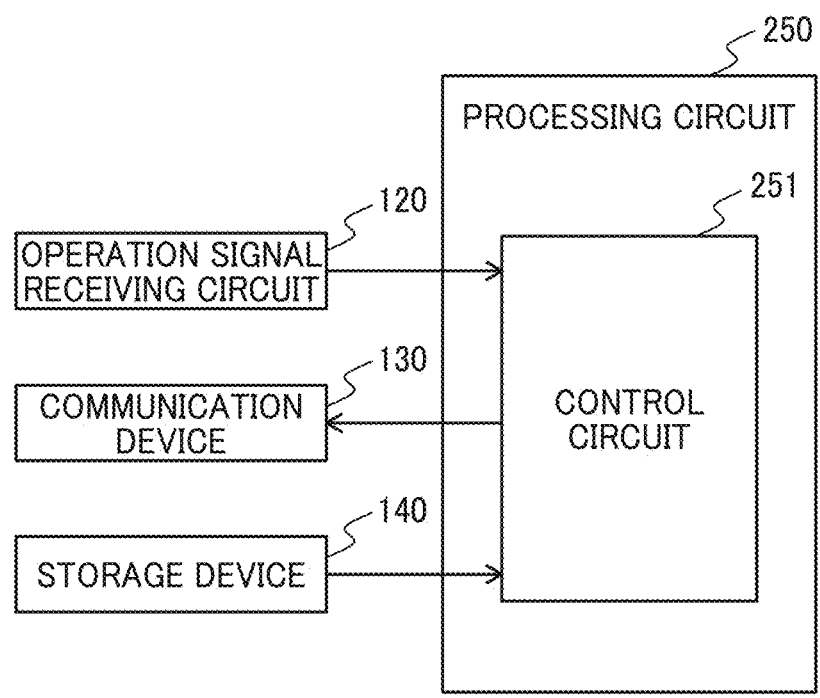
FIG. 10 is a schematic block diagram illustrating a configuration of another processing circuit according to an embodiment.

FIG. 10 is a schematic block diagram illustrating a configuration of a processing circuit (processing circuitry) 250 of an input device according to another embodiment.

As illustrated in FIG. 10, the processing circuit 250 is used instead of the processing circuit 150 of the input device 100, and executes the control process etc. instead of the processing circuit 150. The processing circuit 250 includes a control circuit 251 etc. The control circuit 251 may be configured by an integrated circuit etc.

The control circuit 251 is an example of a control unit and has the substantially the same functions as the control unit 151. The control circuit 251 receives an operation signal from the operation signal receiving circuit 120, reads information from the storage device 140, and transmits output information corresponding to the operation signal to the information processing apparatus via the communication device 130. The control circuit 251 performs exclusive control on an operation indicated by the received operation signal.

As detailed above, the input device using the processing circuit 250 can also enhance user convenience and prevent the occurrence of an erroneous operation on the plurality of touchpads.

Although several embodiments of the present disclosure have been described above, the embodiments are not limited thereto. For example, the touchpad 110 may be arranged on the back side of the housing 101. For example, the touchpad 110a is arranged on the left portion of the back face of the housing 101, the touchpad 110b is arranged on the left face of the housing 101, the touchpad 110c is arranged on the right portion of the back face of the housing 101, and the touchpad 110d is arranged on the right face of the housing 101. In this case, a command is set to a combination of a pair of touchpads arranged adjacent to the left back corner or the right back corner of the housing, and this allows the user to easily perform a predetermined action to the information processing apparatus using his or her left hand or right hand alone. Each touchpad 110 may be disposed at any position on the housing 101. Further, one of the touchpads 110a, 110b, 110c, and 110d may be omitted.

The input device 100 may include a changing switch (physical switch) on the housing 101 for changing mapping tables included in mapping information. The input device 100 may store a command for changing mapping table in the mapping information.

The input device 100 is not limited to a keyboard device, and may be any device having a plurality of touchpads, such as a tablet terminal or a speaker device, or may be a device that does not include a key switch.

To provide a keyboard device that enhances user convenience is desired.

According to an embodiment, a keyboard device, a control method, and a control program can enhance user convenience.

The above-described embodiments are illustrative and do not limit the invention. Thus, numerous additional modifications and variations are possible in light of the above teachings. For example, elements and/or features of different illustrative embodiments may be combined with each other and/or substituted for each other within the scope of the invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. A keyboard device, comprising:
a key switch corresponding to a character;
a plurality of touchpads;
a memory to store mapping information in which a code to be output to an information processing apparatus is set for each combination of operations on the plurality of touchpads;
a communication interface to communicate with the information processing apparatus; and
circuitry,
wherein, when a combination of operations on the plurality of touchpads is received, the circuitry identifies a code corresponding to the combination of the operations on the plurality of touchpads based on the mapping information and outputs the identified code to the information processing apparatus via the communication interface.

2. The keyboard device of claim 1, further comprising a housing provided with the plurality of touchpads, wherein the housing does not have a display.

3. The keyboard device of claim 1, wherein
the circuitry is configured to:
distinguish operations on the plurality of touchpads based on at least one of operation direction, duration of contact, frequency of contact, area of contact, or a number of contact areas on the plurality of touchpads; and
output a code corresponding to the distinguished operations on the plurality of touchpads to the information processing apparatus via the communication interface.

4. The keyboard device of claim 1, wherein
the key switch includes a plurality of key switches including a special key,
the mapping information includes a code for each combination of operations on the plurality of touchpads and an operation on the special key, and
when receiving a combination of operations on the plurality of touchpads and an operation on the special key, the circuitry identifies a code corresponding to the combination of the operations on the plurality of touchpads and the operation on the special key based on the mapping information and outputs the identified code to the information processing apparatus via the communication interface.

5. The keyboard device of claim 1, wherein
the mapping information includes a plurality of mapping tables, and
the circuitry is configured to change a mapping table currently used to one of other mapping tables in response to receiving a mapping table change request.

6. The keyboard device of claim 1, wherein
each of the plurality of touchpads is arranged on at least one of a left side, a right side, a front side, and a back side of the keyboard device.

7. A control method, comprising:
storing mapping information in which a code to be output to an information processing apparatus is set for each combination of operations on a plurality of touchpads in a memory; and
when a combination of operations on the plurality of touchpads is received, identifying a code corresponding to the combination of the operations on the plurality of touchpads based on the mapping information and outputting the identified code to the information processing apparatus via a communication interface.

8. A non-transitory recording medium storing a plurality of instructions which, when executed by one or more processors, causes the processors to perform a method, the method comprising:
storing mapping information in which a code to be output to an information processing apparatus is set for each combination of operations on a plurality of touchpads in a memory; and
when receiving a combination of operations on the plurality of touchpads, identifying a code corresponding to the combination of the operations on the plurality of touchpads based on the mapping information and outputting the identified code to the information processing apparatus via a communication interface.

* * * * *